(12) United States Patent
Sivik et al.

(10) Patent No.: US 8,968,018 B2
(45) Date of Patent: *Mar. 3, 2015

(54) ELECTRICAL PENETRATOR ASSEMBLY

(71) Applicant: Teledyne Instruments, Inc., Thousand Oaks, CA (US)

(72) Inventors: Gregory P. Sivik, Ormond Beach, FL (US); Roy E. Jazowski, Ormond Beach, FL (US); David A. Painter, Daytona Beach, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 13/786,203

(22) Filed: Mar. 5, 2013

(65) Prior Publication Data

US 2013/0183853 A1 Jul. 18, 2013

Related U.S. Application Data

(63) Continuation-in-part of application No. 13/614,336, filed on Sep. 13, 2012, now abandoned, which is a continuation of application No. 12/841,029, filed on Jul. 21, 2010, now Pat. No. 8,287,295.

(60) Provisional application No. 61/231,521, filed on Aug. 5, 2009.

(51) Int. Cl.
  *H01R 13/52* (2006.01)
  *H01R 13/523* (2006.01)
  *H02G 3/22* (2006.01)

(52) U.S. Cl.
  CPC .............. *H01R 13/523* (2013.01); *H02G 3/22* (2013.01)
  USPC ............ 439/271; 439/281; 439/732; 439/519

(58) Field of Classification Search
  USPC .......................... 439/271, 281, 519, 587, 732
  See application file for complete search history.

(56) References Cited

U.S. PATENT DOCUMENTS

| 2,700,140 A | 1/1955 | Phillips |
| 2,740,098 A | 3/1956 | Phillips |

(Continued)

FOREIGN PATENT DOCUMENTS

| GB | 2222032 A | 2/1990 |
| GB | 2331871 A | 6/1999 |

(Continued)

OTHER PUBLICATIONS

GLYNWED / FRIATEC at the ONS-Exhibition. http://www.offshoretechnology.com/contractors/valves/glynwed/ press14.html, Jul. 21, 2008, 3 pages.

(Continued)

*Primary Examiner* — James Harvey
(74) *Attorney, Agent, or Firm* — Procopio Cory Hargreaves & Savitch LLP

(57) ABSTRACT

An electrical penetrator assembly has a ceramic housing with a through bore, a first electrical conductor extending through at least part of the bore and terminating and having an outer end outside the bore and a second end, and a second electrical conductor having a first end in electrical communication with the second end of the first conductor and an outer end. The second end of the first conductor and the first end of the second conductor are in electrical communication and at least one of the conductors is movable relative to the other conductor to accommodate expansion and contraction as a result of temperature variations, and first and second seals extend between respective ends of the ceramic housing and the first and second conductor, respectively.

37 Claims, 13 Drawing Sheets

(56) References Cited

U.S. PATENT DOCUMENTS

| | | | |
|---|---|---|---|
| 2,758,291 A | 8/1956 | Richards | |
| 3,007,130 A * | 10/1961 | Martin | 439/736 |
| 3,092,431 A | 6/1963 | Bilbrey | |
| 3,158,420 A | 11/1964 | Olson et al. | |
| 3,243,756 A | 3/1966 | Ruete et al. | |
| 3,307,137 A | 2/1967 | Tordoff et al. | |
| 3,376,541 A | 4/1968 | Link | |
| 3,471,669 A | 10/1969 | Curtis | |
| 3,513,425 A | 5/1970 | Arndt | |
| 3,522,576 A | 8/1970 | Cairns | |
| 3,559,141 A | 1/1971 | Hardy | |
| 3,587,035 A | 6/1971 | Kotski et al. | |
| 3,643,208 A | 2/1972 | Massa, Jr. | |
| 3,656,084 A | 4/1972 | Malia | |
| 3,670,287 A | 6/1972 | Keto | |
| 3,678,432 A | 7/1972 | Boliver | |
| 3,750,088 A | 7/1973 | Berian | |
| 3,772,636 A | 11/1973 | Webb | |
| 3,793,608 A | 2/1974 | Ring et al. | |
| 3,816,641 A | 6/1974 | Iversen | |
| 3,818,407 A | 6/1974 | Edgerton | |
| 3,898,731 A | 8/1975 | Ring et al. | |
| 3,952,218 A | 4/1976 | Deters | |
| 3,982,812 A | 9/1976 | Boliver | |
| 3,992,567 A | 11/1976 | Malia | |
| 3,994,552 A | 11/1976 | Selvin | |
| 4,006,288 A | 2/1977 | Stevens | |
| 4,032,205 A | 6/1977 | Taj | |
| 4,099,021 A | 7/1978 | Venezia | |
| 4,142,770 A | 3/1979 | Butler, Jr. et al. | |
| 4,174,145 A | 11/1979 | Oeschger et al. | |
| 4,204,739 A | 5/1980 | Shoenleben | |
| 4,266,844 A | 5/1981 | Chelminski | |
| 4,334,729 A | 6/1982 | Allen et al. | |
| 4,383,131 A | 5/1983 | Clabburn | |
| 4,431,861 A | 2/1984 | Clabburn et al. | |
| 4,521,642 A | 6/1985 | Vives | |
| 4,728,296 A | 3/1988 | Stamm | |
| 4,790,768 A | 12/1988 | Domingues | |
| 4,797,117 A | 1/1989 | Ayers | |
| 4,854,886 A * | 8/1989 | Neuroth | 439/192 |
| 4,874,324 A | 10/1989 | Andersen et al. | |
| 4,909,751 A | 3/1990 | Marolda, Jr. | |
| 4,927,372 A * | 5/1990 | Collier | 439/83 |
| 4,948,377 A | 8/1990 | Cairns | |
| 5,015,016 A | 5/1991 | Smith, III | |
| 5,051,103 A | 9/1991 | Neuroth | |
| 5,070,597 A | 12/1991 | Holt et al. | |
| 5,166,477 A | 11/1992 | Perin, Jr. et al. | |
| 5,174,765 A | 12/1992 | Williams et al. | |
| 5,193,614 A | 3/1993 | Cox | |
| 5,361,834 A | 11/1994 | Cox | |
| 5,493,073 A * | 2/1996 | Honkomp | 174/152 GM |
| 5,670,747 A | 9/1997 | Lawer et al. | |
| 5,700,161 A | 12/1997 | Plummer et al. | |
| 5,808,258 A | 9/1998 | Luzzi | |
| 5,833,490 A | 11/1998 | Bouldin | |
| 5,942,333 A | 8/1999 | Arnett et al. | |
| 6,139,354 A | 10/2000 | Broussard | |
| 6,328,615 B1 * | 12/2001 | Safai | 439/851 |
| 6,332,787 B1 | 12/2001 | Carlow | |
| 6,397,945 B1 | 6/2002 | Manke et al. | |
| 6,443,780 B2 | 9/2002 | Wilgourn et al. | |
| 6,464,523 B1 | 10/2002 | Levine | |
| 6,475,008 B1 | 11/2002 | Marolda et al. | |
| 6,628,024 B1 * | 9/2003 | Mirmobin | 310/71 |
| 6,659,780 B2 | 12/2003 | Parkinson | |
| 6,677,528 B2 | 1/2004 | Amerpohl et al. | |
| 6,821,145 B1 * | 11/2004 | Pollock et al. | 439/559 |
| 6,943,298 B2 | 9/2005 | Nicholson | |
| 7,534,147 B2 | 5/2009 | Marklove et al. | |
| 7,695,301 B2 | 4/2010 | Mudge, III | |
| 7,794,254 B2 | 9/2010 | Marklove et al. | |
| 7,959,454 B2 | 6/2011 | Ramasubramanian et al. | |
| 8,123,549 B2 | 2/2012 | Jazowski et al. | |
| 8,287,295 B2 | 10/2012 | Sivik et al. | |
| 8,638,273 B2 * | 1/2014 | Geer | 343/888 |
| 8,901,440 B2 | 12/2014 | Rousseau et al. | |
| 2002/0064986 A1 | 5/2002 | Hirai et al. | |
| 2004/0029443 A1 | 2/2004 | Quadir et al. | |
| 2004/0248466 A1 | 12/2004 | McCarthy | |
| 2006/0009073 A1 | 1/2006 | Holliday | |
| 2007/0298654 A1 | 12/2007 | Holliday | |
| 2008/0020611 A1 | 1/2008 | Marklove et al. | |
| 2008/0314616 A1 | 12/2008 | Benestad et al. | |
| 2009/0047815 A1 | 2/2009 | Nicholson | |
| 2013/0183853 A1 * | 7/2013 | Sivik et al. | 439/519 |

FOREIGN PATENT DOCUMENTS

| | | |
|---|---|---|
| GB | 2434698 A | 8/2007 |
| GB | 2448985 A | 11/2008 |
| JP | 31-005455 | 4/1956 |
| JP | 1-206813 A | 8/1989 |
| JP | 2003243101 A | 8/2003 |
| JP | 2008-312373 A | 12/2008 |
| KR | 10-2004-027024 | 4/2004 |
| WO | 84/00078 A1 | 1/1984 |
| WO | 97/13890 A1 | 4/1997 |
| WO | 98/45900 A1 | 10/1998 |
| WO | 99/13532 A1 | 3/1999 |
| WO | 01/40837 A2 | 6/2001 |
| WO | 2004/055954 A1 | 7/2004 |
| WO | 2007/016072 A2 | 2/2007 |

OTHER PUBLICATIONS

International Search Report and Written Opinion for PCT/US2010/044348 dated Feb. 21, 2011.
International Search Report and Written Opinion for PCT/US2010/042522 dated Jan. 27, 2011.
International Search Report and Written Opinion for PCT/US2010/042757 dated Feb. 25, 2011.
Office Action for related JP Patent Application No. JP 2012-523634, mailed on Apr. 8, 2014, in 5 pages.
Office Action for related JP Patent Application No. 2012-523723 dated Jun. 6, 2014 in 11 pages.
Extended European Search Report for related EP Patent Application No. 10806833.9, mailed on Sep. 4, 2014, in 7 pages.
Extended European Search Report for related EP Patent Application No. 10807074.9, mailed on Sep. 4, 2014, in 6 pages.

* cited by examiner

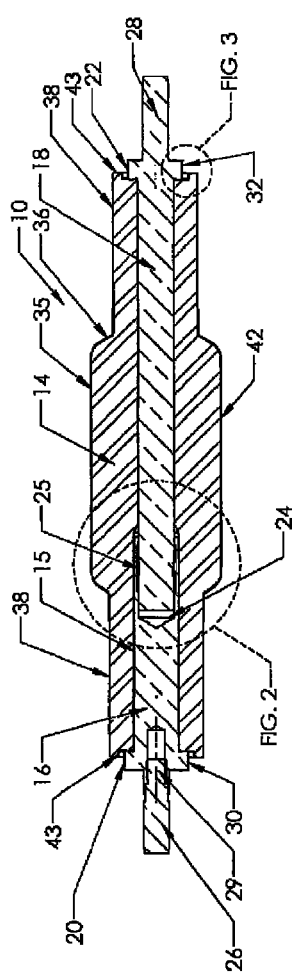
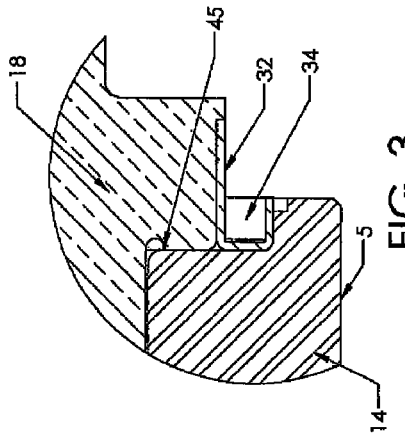
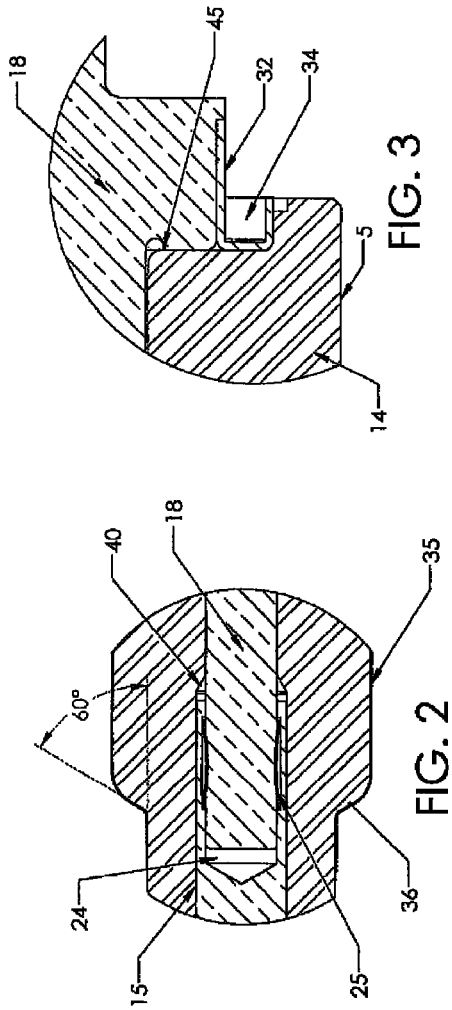

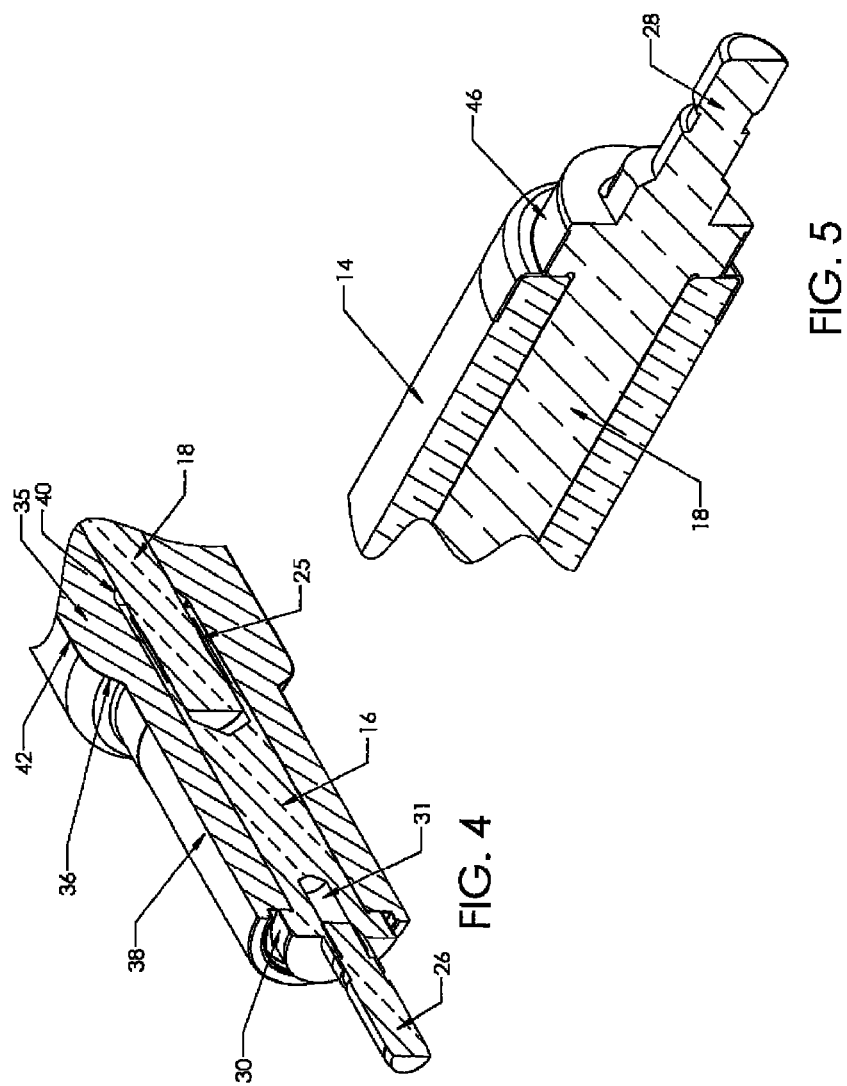

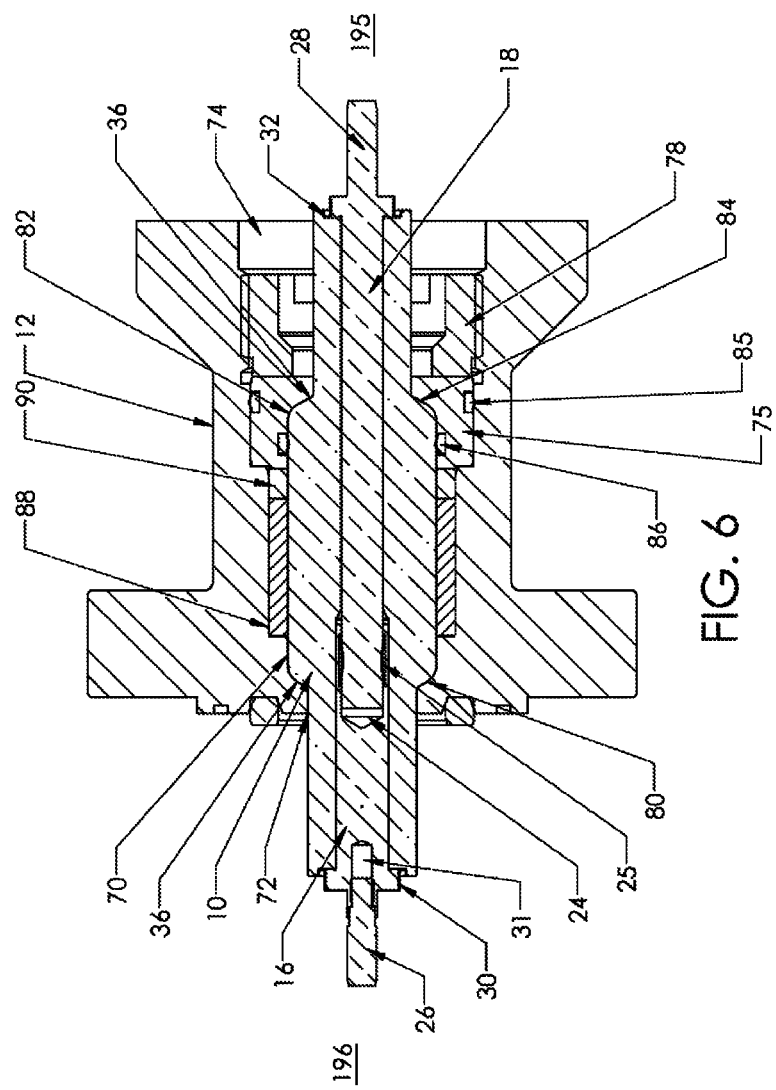

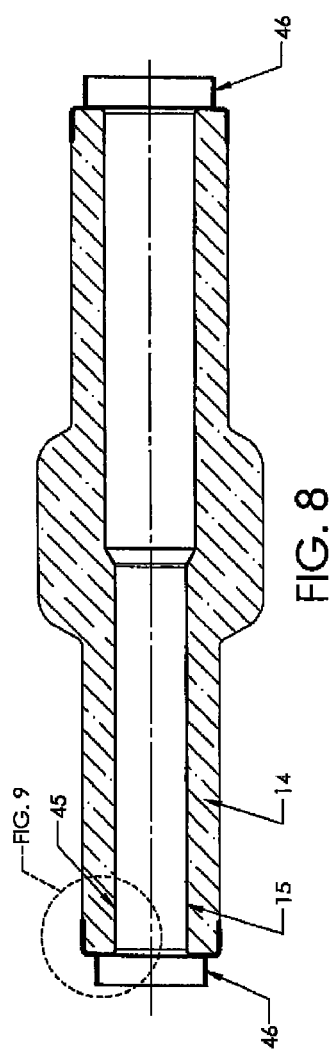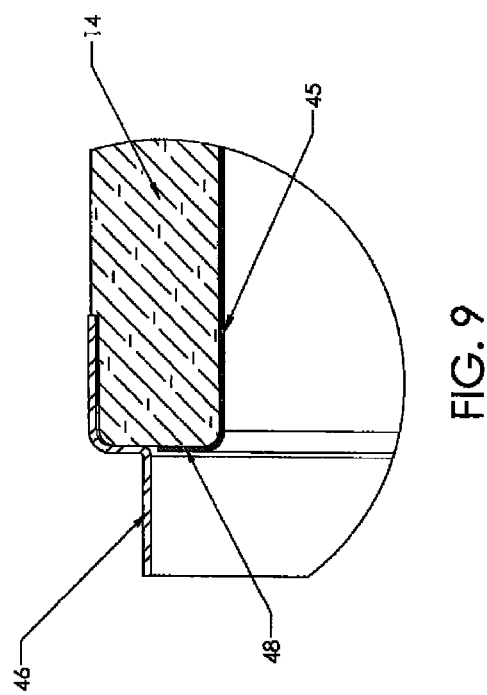

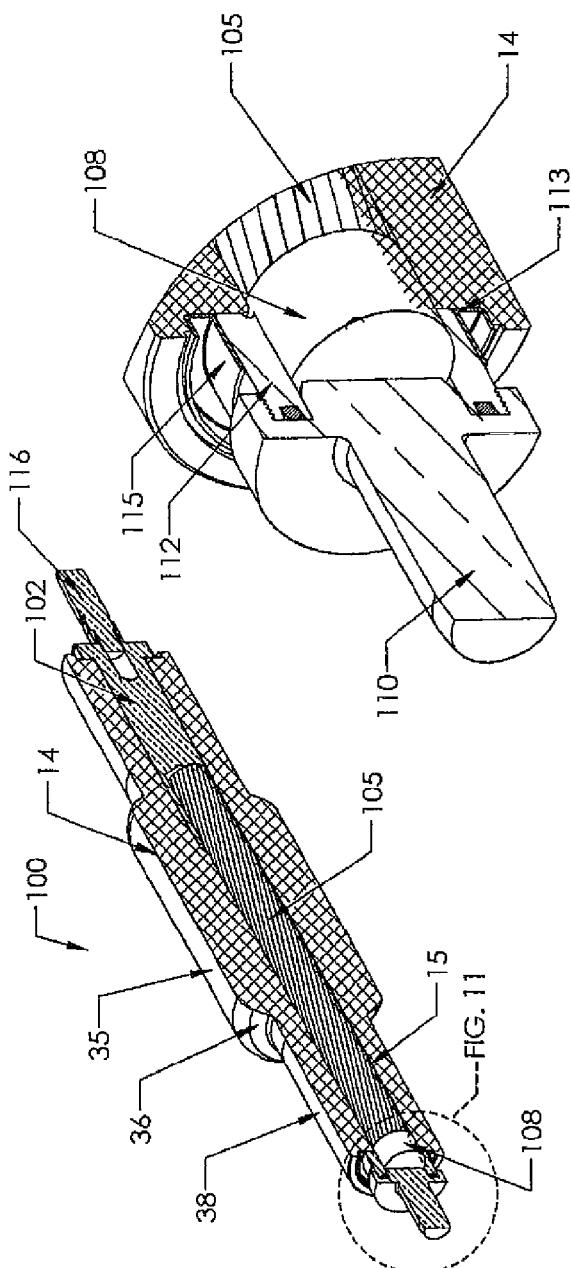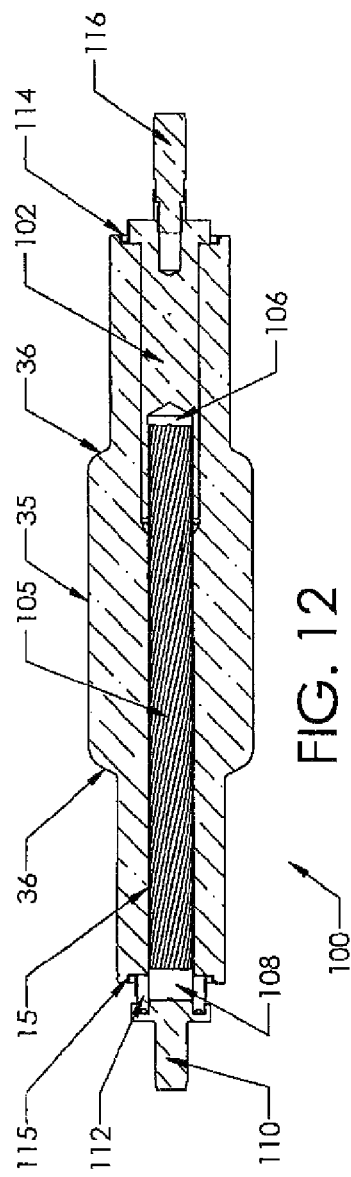

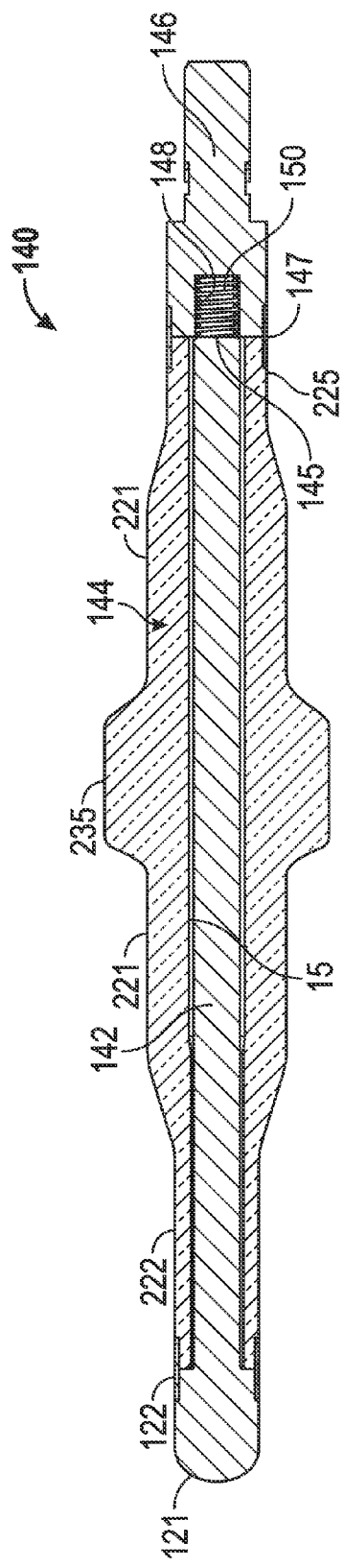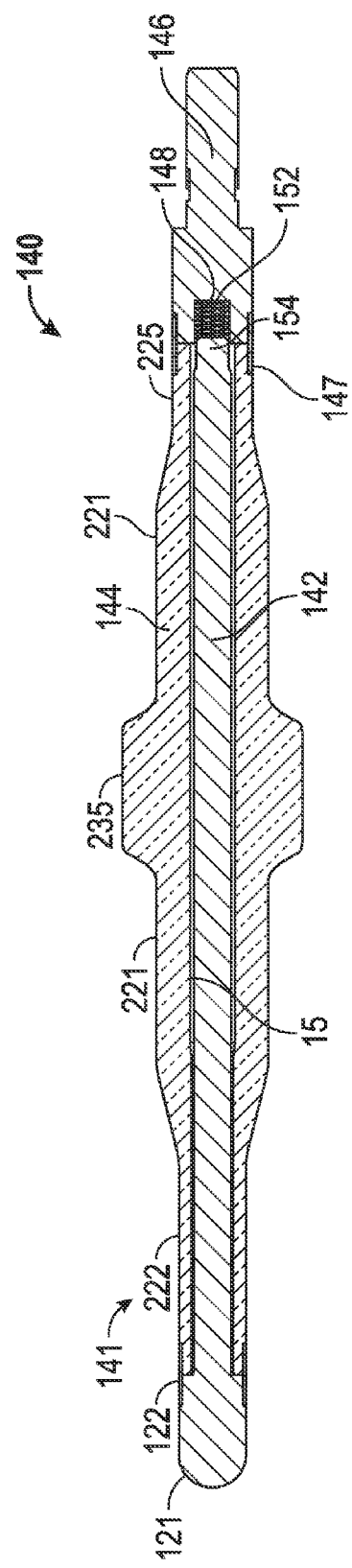

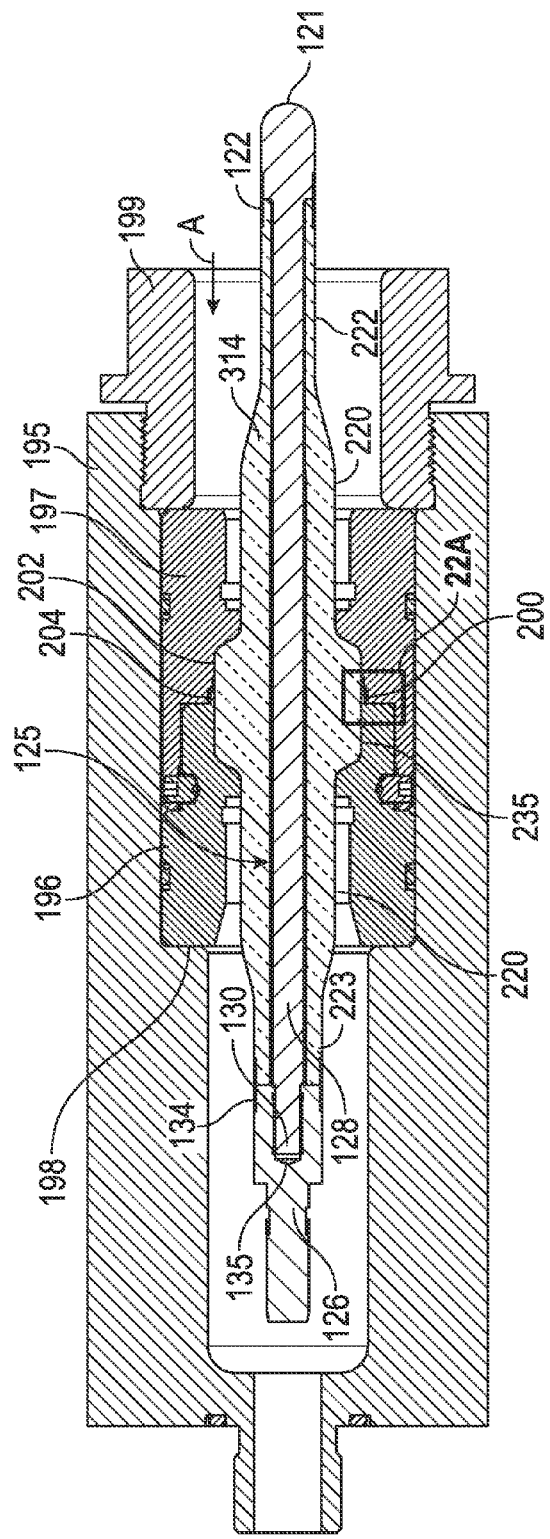
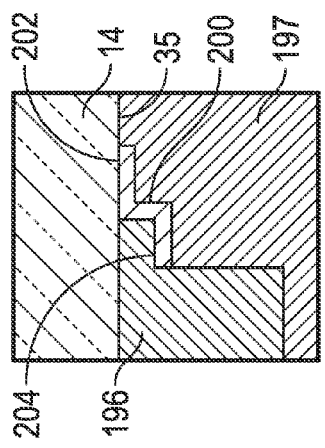
FIG. 22
FIG. 22A

ELECTRICAL PENETRATOR ASSEMBLY

RELATED APPLICATION

The present application is a Continuation-In-Part of U.S. patent application Ser. No. 13/614,336 filed on Sep. 13, 2012, which is a continuation of U.S. patent application Ser. No. 12/841,029 filed on Jul. 21, 2010, now issued as U.S. Pat. No. 8,287,295, which claims the benefit of U.S. provisional patent App. Ser. No. 61/231,521, filed Aug. 5, 2009, and the contents of each of the aforementioned applications are incorporated herein by reference in their entirety.

BACKGROUND

1. Field of the Invention

The present invention relates generally to electrical penetrator assemblies for feed through of electrical power through the wall of a pressurized vessel or the like, and is particularly concerned with an electrical penetrator assembly for subsea use.

2. Related Art

Electrical penetrators are used to power subsea electric submersible pump (ESP) equipment and the like which pump hydrocarbons in oil well installations, and also in other applications such as high pressure downhole electrical penetrations and other penetrations to provide power to various types of subsea equipment. The penetrator extends through the wall or bulkhead of the vessel in which the equipment is located, and is normally connected to power cables at one end for connecting the equipment to an external power source. In an ESP application, the connection or penetrator cannot be isolated from the pumping pressure for practical reasons. This creates an extreme environment for the connector or penetrator in terms of pressure, temperature, and high voltage. The penetrator must transfer power to the motor as well as maintaining a pressure barrier for both internal pressure created by the ESP and external pressure caused by the depth in seawater. The temperatures are increased due to fluid temperatures as well as resistive heating of the electrical elements.

In a typical electrical penetrator or feed through arrangement, a one-piece conductor such as a conductive connector pin extends through a bore in an insulating sleeve or body, with appropriate seals brazed or bonded between the outer body and pin at each end of the penetrator assembly. This causes problems in manufacture and in subsequent use of the penetrator, due to the different coefficients of expansion of the different materials used in the penetrator assembly. In one known arrangement, the seals comprise metal sealing sleeves which seal the insulating sleeve of ceramic or the like to the conductive connector pin body. Due to the heat involved during the brazing or bonding process, the parts expand by different amounts. Once the penetrator assembly is allowed to cool, the different rates of shrinkage of the different material parts causes stress on the ceramic housing material, brittle bonds, or both, and may lead to failure of the seal. Additionally, most existing penetrators are designed for high pressure on one side only, and application of pressure on the other side may cause additional stress on the seal arrangement and the ceramic housing.

SUMMARY

Embodiments described herein provide for an electrical penetrator assembly which is particularly suitable for high pressure, high temperature, and high voltage applications such as subsea use.

According to one embodiment, an electrical penetrator assembly is provided which comprises a ceramic housing having a through bore, a first electrical conductor extending through a first end of the bore and terminating short of a second end of the bore and having an outer end engageable with a first cable, a second electrical conductor extending through a second end of the bore and terminating short of the first end of the bore, the second conductor having an outer end engageable with a second cable, the conductors having slidably or telescopically engaging inner ends. First and second seals extend between the ceramic housing and first and second conductor, respectively, at each end of the assembly. In one embodiment, a conductive layer or coating is provided on the inner diameter of the ceramic housing, between the housing and telescopically engaged conductors.

In one embodiment, the inner end of one conductor has a bore and the inner end of the other conductor is slidably engaged in the bore. An internal sliding contact band may be provided between the opposing faces of the bore and conductor inner end, to maintain electrical contact between the conductors as they move inwardly and outwardly.

In another embodiment, an electrical penetrator assembly comprises a ceramic housing having a through bore with opposite first and second ends, a rigid conductor extending into the first end of the bore and terminating short of the second end, and a flexible conductor secured to the inner end of the conductor and extending out of the second end of the bore, with a suitable seal arrangement between the conductor and bore at one end, and between the flexible conductor and bore at the other end of the assembly. In this arrangement, the flexible conductor moves to compensate for different rates of thermal expansion and contraction of the rigid conductor, ceramic housing, and seals, reducing stress between the sealing sleeves and ceramic or insulating housing.

In yet another embodiment, a single conductor extends through the ceramic housing through bore and engages a conductive end member or socket member at the second end of the ceramic housing, with a pin and socket engagement between the single conductor and socket member or other interface arrangements allowing for axial contraction or expansion as a result of different coefficients of thermal expansion of the parts of the penetrator assembly.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1 is a cross sectional view of a first embodiment of an electrical penetrator pin assembly;

FIG. 2 is an enlarged cross-sectional view of the circled sliding contact area of the dual contact pins of FIG. 1;

FIG. 3 is an enlarged view of the circled end seal area of FIG. 1, illustrating the metal end seal at one end of the assembly;

FIG. 4 is a broken away perspective view of one end of the assembly of FIG. 1

FIG. 5 is a broken away perspective view of a modified penetrator pin assembly with a different end seal arrangement;

FIG. 6 is a cross-sectional view of a complete electrical penetrator unit including the penetrator pin assembly of FIGS. 1 to 4;

FIG. 8 is a cross-sectional view of the dielectric housing of the pin assembly of FIG. 5, illustrating an optional internal conductive coating;

FIG. 9 is an enlarged cross-sectional view of the circled area of FIG. 8, illustrating extension of the internal conductive coating up to the metal end seal;

FIG. 10 is a broken away perspective view illustrating another embodiment of an electrical penetrator pin assembly;

FIG. 11 is an enlarged view of the circled area of FIG. 10;

FIG. 12 is a longitudinal cross-sectional view of the penetrator pin assembly of FIGS. 10 and 11;

FIG. 16 is a cross-sectional view illustrating a modified penetrator with a coil spring between conductor portions for allowing relative movement while transmitting electrical signals between the conductor potions;

FIG. 17 is a cross-sectional view similar to FIG. 16 but illustrating an alternative embodiment in which the coil spring of FIG. 16 is replaced with a wave spring;

FIG. 22 is a cross-sectional view of a modified penetrator housing illustrating an alternative Z-sleeve weld configuration between the ceramic body of the penetrator and the penetrator housing;

FIG. 22A is an enlarged sectional view of the Z-joint and adjacent portions encircled by a square in FIG. 22;

DETAILED DESCRIPTION

Figure 7:
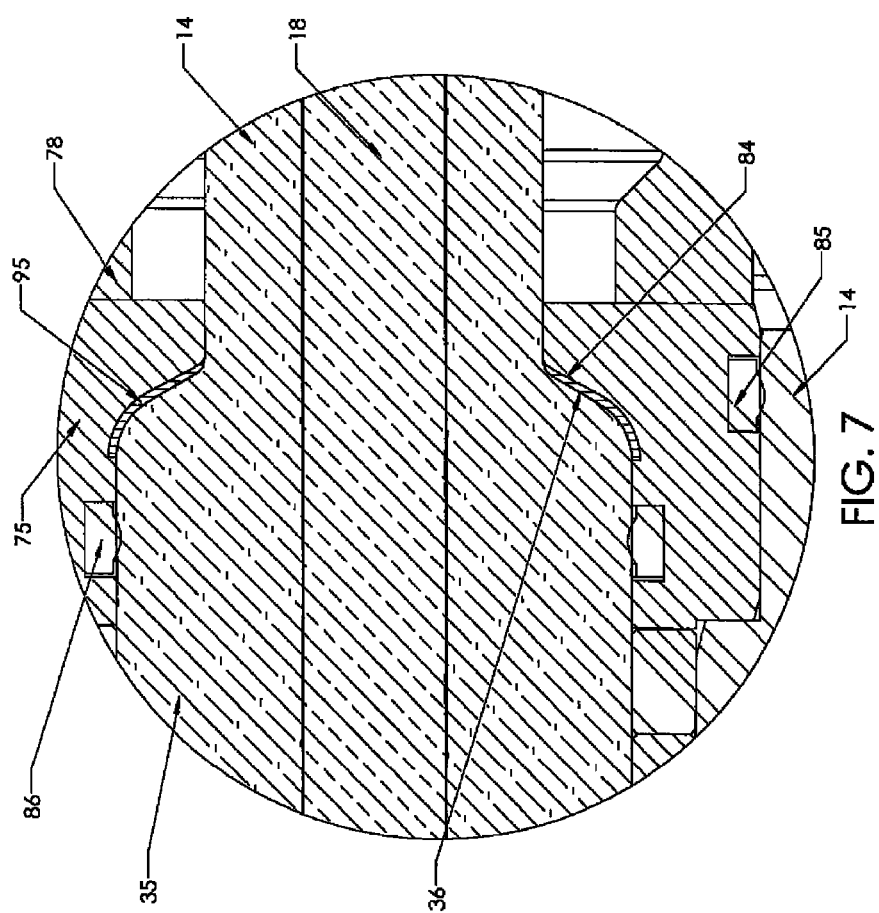
FIG. 7 is an enlarged cross-sectional view of the pin assembly seating area of FIG. 6, illustrating a modification.

Certain embodiments as disclosed herein provide for an electrical penetrator assembly suitable for use in high pressure applications, such as in providing power for subsea equipment.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

FIGS. 1 to 4 illustrate a first embodiment of an electrical penetrator pin assembly or subassembly 10, while FIG. 6 illustrates the assembly 10 mounted in an outer penetrator housing 12 for extending through a wall or bulkhead of a subsea vessel or container. The pin subassembly 10 includes an outer body or housing 14 of ceramic or other dielectric material, the housing 14 having a through bore 15. First and second conductor members or pins 16, 18 having slidably engaged inner ends extend through the housing, with the first pin 16 extending through a first end 20 of the housing bore 15 and terminating short of the second end 22 of the bore, and the second pin 18 extending through the second end 22 of the bore and terminating short of the first end 20. The pins or conductor members are of suitable rigid conductive material such as copper or the like. The inner ends of the two pins are telescopically engaged, as illustrated in more detail in FIG. 2, with the inner end of the first pin 16 having an inwardly extending bore 24 and inner end of the second pin 18 slidably or telescopically engaged in the bore, so that the overall length of the conductive pin assembly can vary. An internal sliding contact band 25 mounted in an annular recess in bore 24 provides a sliding electrical engagement or contact interface between the pins 16 and 18 while permitting the pins to telescope inwardly and outwardly to compensate for various types of stress, as discussed in more detail below. Band 25 provides a clearance between the opposing inner surface of bore 24 and outer surface of pin 18, while still providing electrical contact between the two pins or conductor halves at all times. The contact band may alternatively be mounted on the outer surface of the portion of pin 18 which engages in bore 24 in other embodiments.

A cable connector 26 is provided at the outer end of the first pin for connection to a first cable on one side of the penetrator assembly, while cable connector 28 at the outer end of the second pin 18 is designed for connection to a second cable on the opposite side of the penetrator assembly. One of the cable connectors 28 is formed integrally with the pin, while the other cable connector 26 is formed separately and has a reduced diameter post 29 which is in threaded engagement in a bore 31 at the outer end of pin 16. Either or both ends of the penetrator may have a two part cable connector or integral cable connector.

Metal sealing sleeves 30, 32 at each end of the outer body 14 hermetically seal the outer ceramic body to the respective conductors or pins 16, 18. Each metal sleeve 30, 32 is generally J-shaped in cross-section, as illustrated in FIG. 3, and the outer ends of the body 14 have annular recesses 34 in which the hooked ends of the respective J-shaped seals 30, 32 are brazed or bonded, as illustrated for sleeve 32 in FIG. 3. The stem of the J-shaped sleeve is welded or brazed to the adjacent outer surface of the respective pin 16, 18. The J-shaped sleeve design is such that the braze joint is tightened by thermal expansion during the brazing process, and also has the advantage that a longer tracking distance is produced for the same penetrator length, as compared to a standard Z-shaped sealing sleeve as used in some prior art single pin penetrators.

The outer dielectric housing 14 has a central portion 35 of enlarged outer diameter and an inclined shoulder or step 36 at each end of the central portion forming a transition to the smaller diameter end portions 38. The angle of shoulders or steps 36 may be in the range from 40 to 75 degrees, and in one embodiment each step had an angle of 60 degrees to the central axis of the pin assembly, as shown in FIG. 2. The through bore 15 is of stepped diameter to accommodate the slightly different outer diameters of the pins 16, 18, with the first end portion which receives the larger pin 16 having a correspondingly larger diameter than the second end portion which receives pin 18, and an angled step 40 between the two end portions. An external conductive coating 42 extends over the larger diameter portion 35 and part of each smaller diameter portion 38 of the body, with an exposed ceramic portion between each sealing sleeve 30, 32 and the adjacent end of coating 42. The conductive coating 42 provides a uniform or substantially uniform ground plane for controlling electrical stress imparted to the ceramic dielectric material, as discussed in more detail below in connection with FIG. 6.

A conductive coating or intermediate conductive or semi-conductive layer 45 may also be provided on the inner diameter of the ceramic body 14 between the ceramic body and the conductors or pins. Layer 45 extends the entire length of bore 15 and also around the end faces 43 of the body, as indicated in FIG. 3. In one embodiment, the coating may comprise a moly-manganese sintered coating, followed by nickel plating, although any semi-conductive or conductive coating may be used for this purpose. The purpose of coating 45 is to provide a bonded high or medium voltage interface at the inner surface of the ceramic or dielectric body 14, allowing a clearance between the conductor pins 16, 18 and the ceramic body. The coating may help to reduce the occurrence and severity of electrical discharges which may degrade the ceramic insulation and ultimately result in component failure. By providing a clearance between the ceramic body and the conductive pins, a high conductivity material such as copper or the like may be used for the pins while not causing issues such as thermal expansion mismatch and induced mechanical stress on the ceramic insulation and the brazed metal seals or sleeves 30, 32. Inner coating layer 45 may be extended over the end faces 43 of the ceramic body, facing the enlarged shoulders of the pins outside the body. This helps to ensure contact between the coating and the conductive pins when opposite ends of the penetrator assembly are exposed to high pressures. The coating on the end faces may or may not terminate short of the conductive metal sealing sleeves 30, 32.

FIG. 5 illustrates a modified end seal arrangement for the dual pin assembly of FIGS. 1 to 4. In FIG. 5, the J-shaped end seals 30, 32 of FIGS. 1 to 4 are replaced by Z-shaped seals or metal sleeves 46 of Z-shaped cross-section (only one of which is seen in FIG. 5). The embodiment of FIG. 5 is otherwise identical to that of FIGS. 1 to 4, and like reference numbers are used for like parts as appropriate. As illustrated in FIG. 5, each sleeve 46 has a first end portion brazed or bonded to the outer surface and part of the end face of body 14, and a second end portion welded or brazed to the outer surface of conductive metal pin 18 adjacent the end face of the ceramic body, forming hermetic seals. In both the embodiments of FIGS. 1 to 4 and that of FIG. 5, the brazed and welded sealing sleeves are designed to increase their sealing contact pressure and effectiveness as a result of applied external pressure on opposite ends of the penetrator pin assembly, so that applied pressure does not stress the braze/weld joint. In the J-sleeve arrangement of FIGS. 1 to 4, the braze joint is tightened by thermal expansion during the brazing process. As in the embodiment of FIGS. 1 to 4, the ceramic body 14 in FIG. 5 has an internal conductive coating layer 45 which extends along the entire length of through bore 15 and over the opposite end faces 48 of the body 14, as best illustrated in FIGS. 8 and 9. In both embodiments, the inner coating extends around opposite end faces of the body as seen in FIG. 9, and contacts the opposing face of the respective contact pin under pressure. The inner coating may terminate short of the metal end sleeves, or extend under the metal end sleeve up to end face 43 of FIG. 1.

FIG. 6 illustrates the penetrator assembly 10 of FIGS. 1 to 4 assembled in an outer feedthrough or penetrator housing 12, which may be of metal or other conductive material such as stainless steel. When the penetrator assembly is assembled in the outer housing as illustrated in FIG. 6, the outer conductive coating 42 is in direct physical contact with the metal outer housing, providing a ground plane continuation. The ground plane may be continued or terminated by a conductive portion of a separate boot seal component (not illustrated) on either end of the assembly 10, 12.

Outer housing 12 has a through bore 70 of stepped diameter, with successive portions of progressively increasing diameter from a first end 72 to a second, larger end 74 of the bore. The penetrator pin assembly is installed via the larger diameter end 74 and suitably secured in place by a seal retainer housing or plate 75 and retainer nut 78. When the assembly 10 is installed, the inclined shoulder 36 at one end of the enlarged portion 35 of the ceramic body 14 abuts a correspondingly shaped shoulder or seat 80 in through bore 70 close to the smaller, first end of the bore. Retainer housing or plate 75 has a through bore 82 with a correspondingly shaped shoulder or seat 84 which abuts the angled shoulder 36 at the opposite end of the enlarged portion 35. Thus, body 14 is held firmly between the opposing shoulders or seats 80 and 84. Rigid housing or plate 75, which may be of metal such as stainless steel, has one or more outer annular or O-ring seals 85 in sealing engagement with an opposing inner surface portion of housing through bore 70, and an inner annular seal or O-ring seal 86 in through bore 82 which seals against the outer surface of the enlarged portion 35 of the dielectric body 14. A gland seal 88 is located at the end of an enlarged portion 90 of bore 70 surrounding the enlarged portion 35 of body 14 between seats or shoulders 80 and 84.

In one embodiment, the penetrator unit of FIG. 6 may be used to supply power from a cable on the seawater side 195 of the bulkhead to a pump on the pump side 196 of the bulkhead, and thus is exposed to high pump pressure on the pump side and to high seawater pressure on the seawater side. The penetrator housing 12, retainer nut 78, and retainer sleeve or plate 75 may be of any suitable rigid material such as stainless steel or other metallic material.

The design of the pin subassembly 10 and the outer housing 12 and retainer components containing the pin subassembly is configured to reduce tensile stress on the insulating or dielectric body 14, while using the compressive strength of the body 14. Ceramic material in particular has much higher compressive than tensile strength. The angle of the inclined shoulders 36 and the corresponding angled faces or seats 80, 84 of the outer housing bore 70 and the bore in retainer sleeve or plate 75, respectively, are designed to improve or optimize mechanical strength. Because of the angled interface, increased pressure at one end of the penetrator assembly results in compressive rather than tensile stress on the ceramic body at the angled interface. This reduces stress on the ceramic material and on the bonds between the ceramic and sealing sleeves, since ceramic material has much higher compressive strength than tensile strength. Any practical angle less than ninety degrees may be used for the angled faces 36 and the mating faces or seating surfaces of the outer housing and retainer ring. As noted above, this angle may be in the range of 40 to 75 degrees, and in one embodiment an angle of 60 degrees was used. Additionally, an intermediate layer 95 of softer material may be used in the seating area between the inclined shoulder and the opposing face of the housing or retainer ring 75, as illustrated in FIG. 7. This creates a conformal load area to further minimize stress concentrations. The softer material may be copper, nickel, elastomeric material, or the like.

The dual sliding pin arrangement of FIGS. 1 to 4 reduces the problems in manufacture of the penetrator assembly which result from the large differences in coefficients of thermal expansion of the conductive pin, ceramic body, and metal sealing sleeves. In prior art single pin arrangements, the high temperatures which arise during brazing of the metal seals to the ceramic body and the conductive pin, which is typically of copper or the like, cause expansion of the copper pin. Subsequent cooling causes the copper pin to shrink, pulling and causing stress on the ceramic body at the bond between the metal sleeve and the body. This may make the bond brittle or cause it to break. This problem is avoided with the two part, telescopically engaging pin assembly of FIGS. 1 to 4, since the contacts can be assembled after metal seal brazing to the ceramic, and the telescoping ends of the pins can slide relative to one another to accommodate thermal expansion and contraction without producing stress on the seal bonds to the ceramic body.

Typical penetrators are designed to have high pressure acting on one end only. The arrangement of FIGS. 1 to 4 is designed to accommodate high pressure at both ends of the penetrator. The different stiffness or elastic modulus of the materials of the conductive pin, ceramic body, and metal sealing sleeves can potentially create relative movement and stress on the seals in a typical penetrator when under pressure. The slidable arrangement of the above embodiment avoids such problems, lowering the stress between the conductors and the ceramic body. The brazed and welded sealing sleeves which are secured to the respective conductor halves or pins are configured so as to increase their sealing contact pressure or effectiveness with increased pressure.

Another embodiment of a penetrator pin assembly or subassembly 100 which may be assembled in housing 12 in place of assembly 10 is illustrated in FIGS. 10 to 12. In this embodiment, the outer ceramic body is identical to that of the previous embodiments, and like reference numbers are used for like parts as appropriate. However, the dual conductor arrangement is different. In this embodiment, a solid conductor pin 102 extends into one end of bore 15 which extends through dielectric outer body or housing 14, and has an inner end attached to a flexible cable or flexible conductor 105 which extends up to the opposite end of bore 15. Opposite ends of flexible cable 105 are crimped or soldered in a bore 106 at the inner end of pin 102 and to an end cap 108, respectively. End cap 108 is welded or otherwise secured to a cable connector 110, and an outer, conductive sealing sleeve 112 extends between connector 110 and an opposing recessed end face 113 of the ceramic body 14. Metallic J-shaped sealing sleeves 114, 115 are brazed at opposite ends of the ceramic body 14, as in the first embodiment, with sleeve 114 brazed to the first end of ceramic body 14 and sleeve 115 brazed to the second end. Sleeve 114 is welded to the adjacent outer surface of conductor pin 102, while sleeve 115 is welded to the outer surface of sleeve 112. A second cable connector 116 is secured to the outer end of pin 102. With this arrangement, the flexible conductor 105 moves or flexes inwardly and outwardly to accommodate variations in thermal expansion. This design also lowers the stress between the conductor and the ceramic outer body during changes in temperature and during temperature and pressure extremes.

Figure 13:
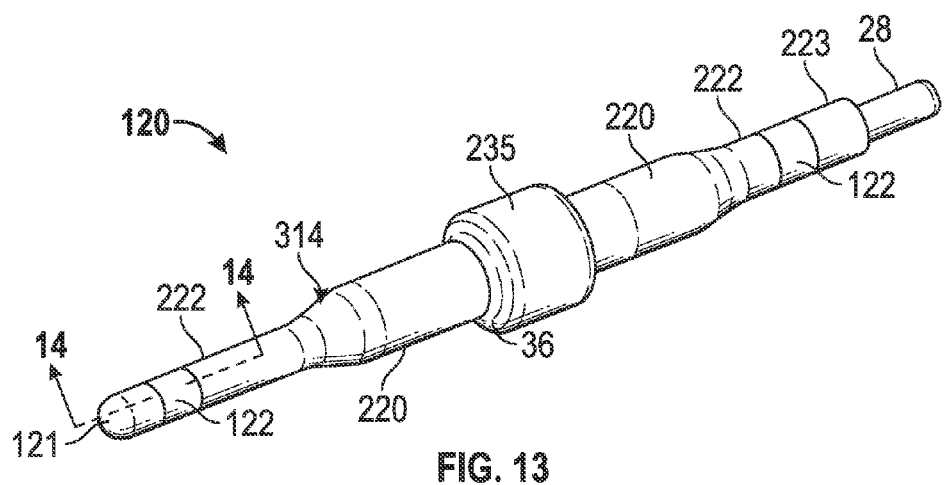
FIG. 13 is a perspective view of an electrical penetrator according to a modified embodiment in which the J-shaped and Z-shaped end seals of FIGS. 1-4 and 5 are replaced by flat or cylindrical end seal sleeves.
Figure 14:
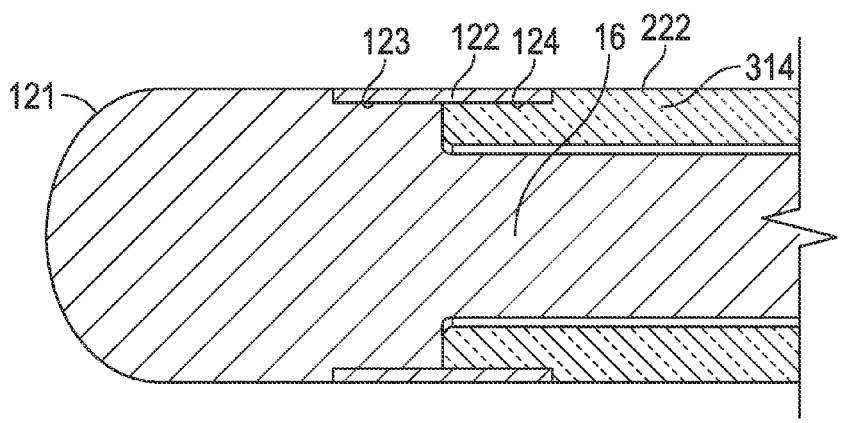
FIG. 14 is a cross-sectional view of an end portion of the penetrator on the lines 14-14 of FIG. 13 illustrating one of the end seals in more detail.

FIGS. 13 and 14 illustrate a modified electrical penetrator or penetrator module 120 which is similar to the arrangement of FIGS. 1 to 5 but has a modified metal seal arrangement between the ceramic body and the respective conductor pins, which replaces the J-shaped and Z-shaped seals of FIGS. 3 and 5. In this embodiment, the end or tip 121 of one or both conductors is designed to be wet-mateable with a corresponding socket of a mating connector unit. In the embodiment of FIG. 13, one of the conductors 16 terminates in a rounded tip 121 designed for mating engagement in a corresponding socket, while the other conductor 18 terminates with an integral or separate cable connector 28, as described above in connection with FIGS. 1 to 5. The ceramic body in this embodiment has a slightly different external shape from that of the previous embodiments, to accommodate the modified metal seal arrangement, as described in more detail below. Apart from the modified seal arrangement, ceramic body shape, and wet-mateable conductor tip at one or both ends, the penetrator module is otherwise similar or identical to that of FIGS. 1 to 5, and like reference numbers are used for like parts as appropriate.

In this embodiment, a straight or "flat" cylindrical sealing sleeve 122 is brazed onto the ceramic body 314 at each end of the penetrator, and the respective conductor rods 16, 18 are subsequently welded or brazed onto the cylindrical sleeve 122, as best illustrated in FIG. 14. In order to accommodate the flush mounting of sealing sleeves 122, the respective ends of the ceramic body 314 and adjacent portions of the conductors 16, 18 are of corresponding outer diameter. Recessed areas 123, 124 at the abutting ends of the respective conductor rod or pin 16, 18 and the adjacent end of the ceramic body 314 are provided for seating the sealing sleeves 122 so that the transition from conductor to sealing sleeve to ceramic is completely flush, as best illustrated in FIG. 14. The ceramic body 314 therefore has a slightly different external shape from the previous embodiment, with a central, larger diameter portion 235 and opposite end portions 220, 222 of progressively stepped diameter extending from each end of central portion 235. End portions 222 may be of the same diameter, or of different diameters as seen in FIG. 13, depending on the diameter of the abutting end portion 121 or 223, respectively, of conductors 16 and 18.

The flat sealing sleeve arrangement of FIGS. 13 and 14 has an advantage over any non-flat geometry such as a J or Z shaped sleeve, due to the flush mounting of the metal sealing sleeves. The resultant uniform outer diameters of the pin, sealing sleeve, and ceramic outer body allow the penetrator assembly to be wet-mateable, i.e. it can enter a standard receptacle unit, such as the traditional stopper assembly of a Nautilus® receptacle, and can interface with the sealing surfaces of the receptacle unit. If the penetrator pin has a sealing sleeve with a J- or Z geometry, it is not able to create a uniform seal with a receptacle unit sealing surface.

Figure 15:
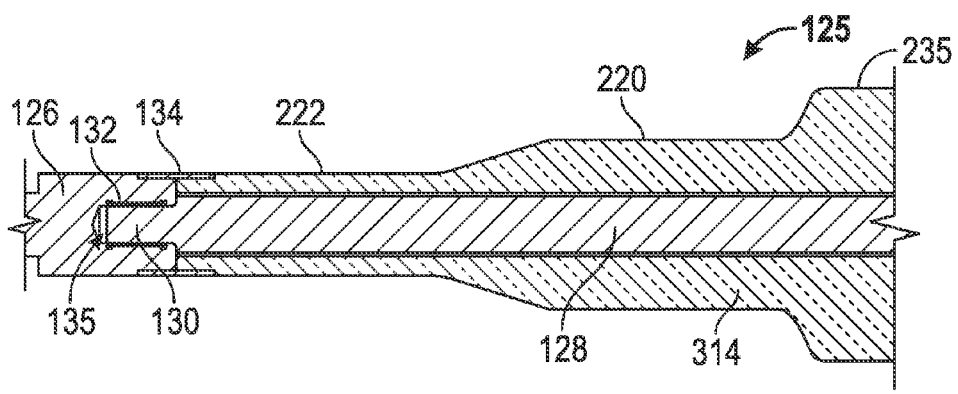
FIG. 15 is a cross-sectional view illustrating part of another embodiment of an electrical penetrator which has a single conductor movable relative to a fixed socket to compensate for different rates of thermal expansion and contraction.

FIG. 15 illustrates an electrical penetrator or penetrator assembly 125 according to another embodiment in which the two conductors which engage in a telescoping motion in the ceramic body through bore as in the first embodiment are replaced by conductor members comprising a fixed conductive socket member 126 at one end of the penetrator and a single conductor or conductor pin 128 having a reduced diameter end portion 130 extending into the socket 132 in socket member 126 with an expansion space or gap 135 between the inner end of conductor 128 and the end of socket or bore 132. This arrangement provides for a small amount of relative movement between the conductor 128 and socket to compensate for changes in conductor geometry due to different coefficients of thermal expansion of the different components of the penetrator. A sliding contact band between the end portion 130 an socket 132 may be provided, as in the first embodiment.

As in the embodiment of FIGS. 13 and 14, a flat or cylindrical sealing sleeve 134 extends over the abutting end portions of the socket member 126 and ceramic body 314, and is welded or brazed to the underlying end portion of the socket member 126 and ceramic body 314. The abutting end portions of the socket member 126 and ceramic body 314 are also recessed to accommodate the thickness of sealing sleeve 134, so that sleeve 134 is flush or at least substantially flush with adjacent surfaces of socket member 126 and ceramic body 314. Thus, in this embodiment, the single conductor 128 extends out of the ceramic insulator body at one end of the penetrator and into the socket 132, while the socket member rather than the conductor is brazed or welded to the end of the ceramic insulator body.

FIG. 16 illustrates another modified penetrator assembly 140 which has a single conductor rod 142 extending through ceramic body 144 which is similar in shape to the ceramic insulator body or housing 314 of the previous embodiments, and like reference numbers have been used for like parts. Ceramic body 144 has opposite end portions 222 and 225 of different external diameters and lengths, with end portion 222 being longer and of smaller diameter than end portion 225. The conductor rod 142 projects out of the first end portion at one end and terminates in a conductor probe or tip 121, as in the embodiment of FIG. 14, and is secured to the first end portion 222 of ceramic body 144 via flat or cylindrical sealing sleeve 122. The opposite end 145 of rod 142 terminates at the end of second end portion 225 of the ceramic body 144.

A second conductor member comprising a conductive socket member or cable end connector 146 is secured to end portion 225 of ceramic body 144 via flat or cylindrical sealing sleeve 147 and has a socket or bore 148 facing conductor end 145. A coil spring 150 of conductive material is seated in bore 148 and bears against conductor end 145. The metal coil spring 150 thus extends between the two conductor portions, i.e. between conductor rod 142 and end connector or socket member 146, and acts to transfer electrical signals between the two conductor pieces as well as to allow relative movement between the conductor portions. It will be understood that a similar coil spring arrangement may be provided between two conductors or conductor rods which engage in the through bore of the ceramic insulator, as in the embodiment of FIGS. 1 to 5.

FIG. 17 illustrates a modification of the embodiment of FIG. 16 in which the coil spring 150 is replaced by a wave spring 152 of conductive material. In this embodiment, the conductor rod 142 has a reduced diameter end portion 154 which extends into socket 148 to engage one end of wave spring 152. The components of the penetrator assembly of FIG. 17 are otherwise identical to those of FIG. 16, and like reference numbers are used for like parts as appropriate. Either a coil spring or a wave spring may be used in either of the embodiments of FIGS. 16 and 17, and springs may also be used in the same manner between the inner ends of the conductors in the two conductor arrangement of FIGS. 1 to 5, in place of the telescoping pin and socket arrangement of that embodiment.

Figure 18:
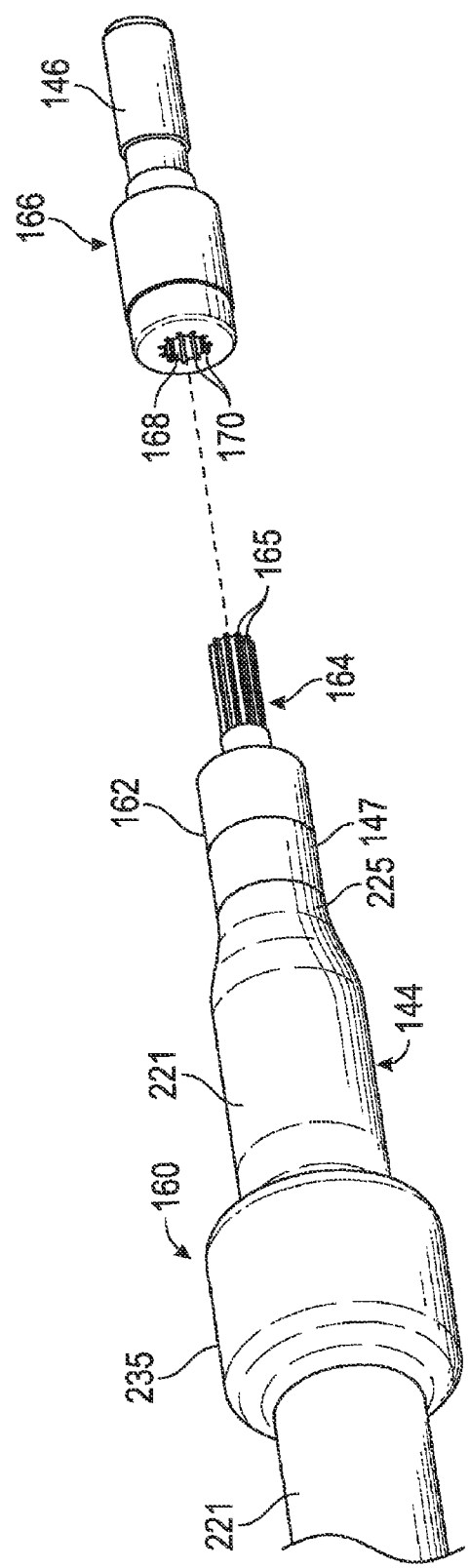
FIG. 18 is an exploded view illustrating a modified embodiment which is similar to FIG. 15 but has a modified telescopic conductor arrangement with interengaging radially configured grooves and ribs.
Figure 19:
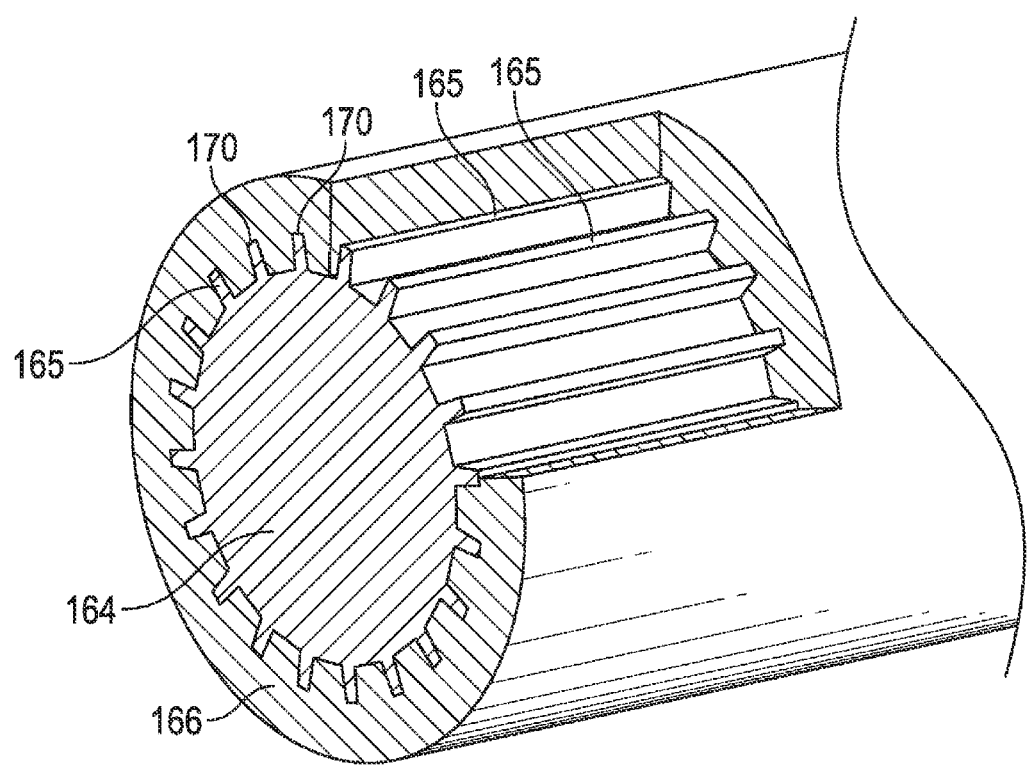
FIG. 19 is a partially cut-away perspective view of the mated conductor portions of the embodiment of FIG. 18.

FIGS. 18 and 19 illustrate an electrical penetrator assembly 160 according to another embodiment with a different interface between two conductor members to allow for some relative movement while still maintaining electrical communication between the conductor members or pieces. In this embodiment, penetrator assembly 160 has a first conductor member or single conductor rod extending through the insulator body 144 which has a projection 162 at one end of body 144 with a reduced diameter end portion 164 having a series of axially extending, radially projecting ribs or prongs 165 at spaced intervals around its circumference. A second conductor member or conductive cable end connector 166 has a mating socket 168 with a corresponding set of axially extending, radially extending grooves 170 configured for slidable, mating engagement with the radially configured ribs 165, as illustrated in FIG. 19. The telescopic engagement between the conductor end portion and conductive socket member 168 allows for relative axial movement between the conductor pieces 162, 166, while the engagement of ribs 165 in radial grooves 170 allows the conductors to remain in electrical communication regardless of any radial contraction or expansion. Thus, this embodiment allows for both radial and axial contraction or expansion of the parts. In the illustrated embodiment, the second conductor member or portion 166 is outside the ceramic insulator body and comprises a cable end connector. However, in alternative embodiments, the same mating end portions may be provided between two conductor rods which extend into opposite ends of the through bore in the ceramic insulator body, in place of the cylindrical pin and socket arrangement of FIGS. 1 to 5.

Figure 20:
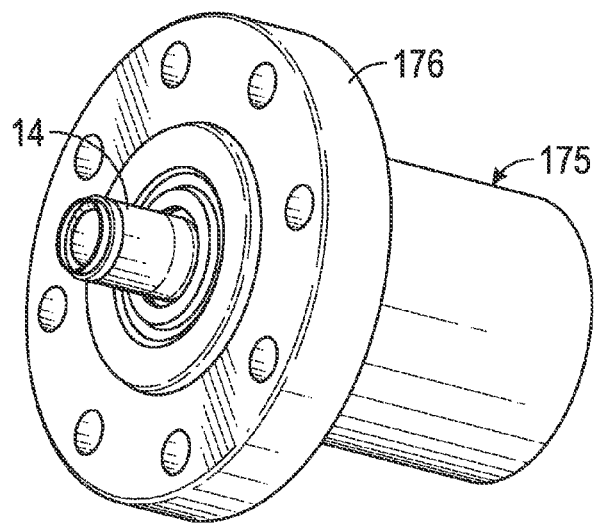
FIG. 20 is a perspective view illustrating a penetrator housing with the ceramic insulator body of the penetrator of any of the previous embodiments welded into the housing.
Figure 21:
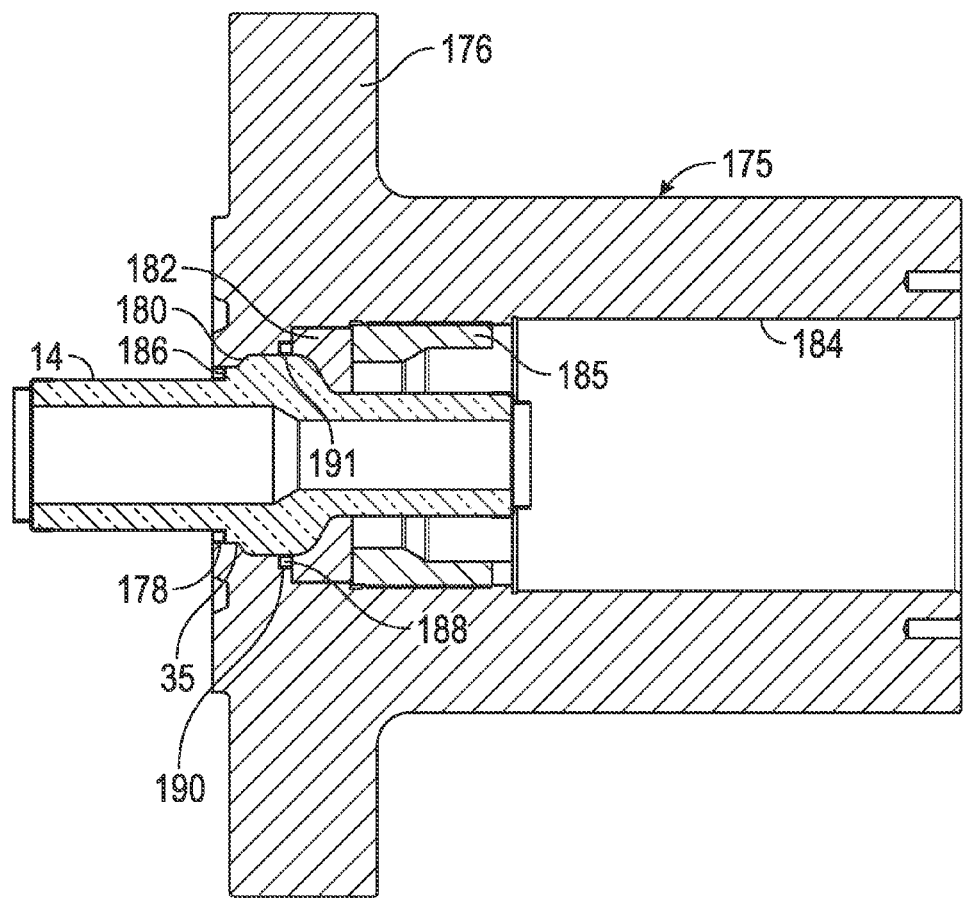
FIG. 21 is a cross-sectional view of the assembly of FIG. 20 illustrating the J-sleeve joints used to weld the ceramic body into the housing.

FIGS. 20 and 21 illustrate hermetic sealing of the ceramic insulator body or housing 14 (or 144) of the penetrator or penetrator assembly of any of the preceding embodiments to an outer housing 175 which has a flange 176 which may be bolted to a bulkhead or wall of a subsea vessel or container, or the like. As in FIG. 6, insulator body 14 extends through a reduced diameter opening 178 in an outer end of housing 175, and is secured in the opening between a shoulder portion 180 of opening 178 engaging one side of the enlarged portion 35 of the insulator body and a retainer plate 182 engaging the opposite side of enlarged portion 35 inside the housing through bore 184. Retainer plate 182 is held in place by retainer nut 185. Opposing inner faces of shoulder portion 180 and retainer plate 182 are shaped to conform to the opposite tapering surfaces 36 of enlarged portion 35 of the insulator body (or to the corresponding tapering surfaces of enlarged portion 235 of the insulator body 314 or 144 of FIGS. 13 to 19).

In this embodiment, the ceramic insulator body 14 is welded and sealed to the penetrator housing 175 using two J-sleeve joints 186, 188. The first J-sleeve joint 186 is welded to the housing 175 and brazed to the ceramic insulator body 14 at the outer end of opening 178. The second J-sleeve joint 188 is welded or brazed to an indented or stepped portion 190 of the housing through bore in front of retainer plate 182, and brazed to the enlarged portion 35 of the insulator body at 191, as illustrated in FIG. 21. Each J-sleeve joint is designed to withstand unidirectional pressure, and the two joints provide a hermetic seal between the housing and ceramic body. The J-sleeve joints provide sealing in opposite directions.

FIG. 22 shows an alternative joint arrangement for sealing a penetrator assembly in an outer housing 195. In the illustrated embodiment, the penetrator or penetrator assembly 125 of FIG. 15 is secured in housing 195, but the penetrators of any of the other embodiments described above could be secured in an outer housing with the same joint arrangement. In FIG. 22, enlarged portion 235 of ceramic insulator body 314 is held in the housing between opposing retainer plates 196, 197 which engage opposite ends of enlarged portion 235, with the first retainer plate 196 extending between shoulder 198 of the housing through bore and opposing plate 197, and the second retainer plate held in the bore by end nut or fastener 199. In this embodiment, the J-sleeve joints of FIGS. 20 and 21 are replaced by a single Z-sleeve joint 200, as best illustrated in the enlarged view of FIG. 22A. As illustrated, Z-sleeve joint 200 has a first portion 202 brazed to the largest diameter portion 235 of the ceramic body 314, and a second portion 200 brazed or welded to the housing retainer plate 196. This Z-sleeve joint is capable of withstanding bidirectional pressure. If the differential pressure is greater in one direction than the other, it is better to have the higher pressure acting on the "open" end of the Z-sleeve, so that the sleeve is forced into the housing rather than pushed out of it. Thus, in the illustrated embodiment, the maximum pressure gradient acts in the direction of arrow A.

Figure 23:
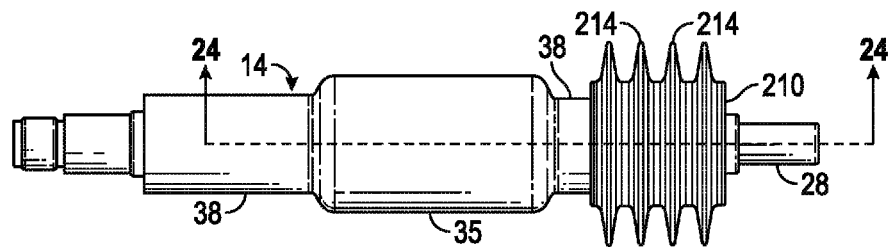
FIG. 23 is a side elevation view of a modified penetrator with an electrical insulation bushing at one end of the assembly.
Figure 24:
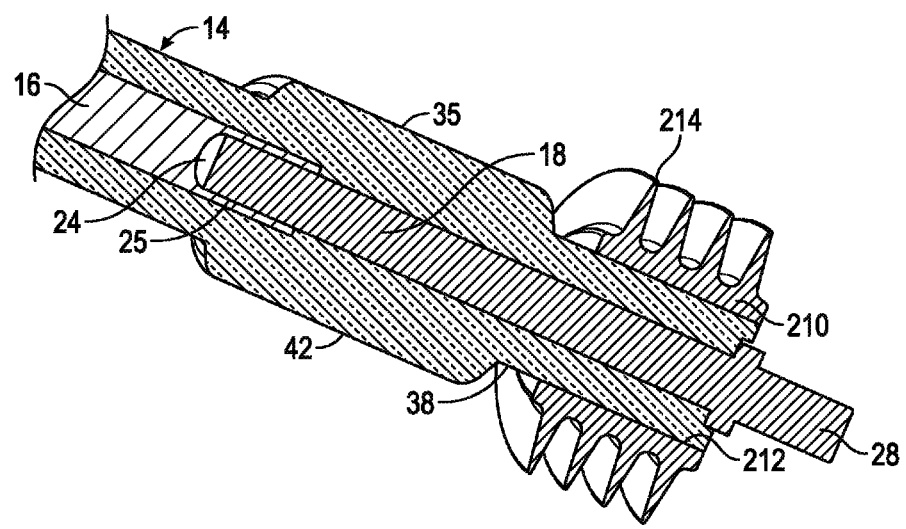
FIG. 24 is a cross-section on the lines 24-24 of FIG. 23.

FIGS. 23 and 24 illustrate a modification of the penetrator or penetrator assemblies of the previous embodiments to include an electrical insulation bushing 210 at one end of the penetrator. In FIGS. 23 and 24, bushing 210 is mounted at one end of penetrator 10 of FIGS. 1 to 5, but it will be understood that a similar bushing may be provided on any of the alternative penetrator assemblies of FIGS. 8 to 20 in other embodiments. The bushing 210 may be located on the end of the penetrator located in a fluid-filled housing or potentially in other environments, and bushings 210 may be provided at both ends of the penetrator in some embodiments. As best illustrated in FIG. 24, bushing 210 extends over the reduced diameter end portion 38 at one end of the ceramic body 14, but it may extend over the abutting ends of the ceramic body and conductor in embodiments with a flat sealing sleeve as in FIGS. 13 to 18. Electrical insulation bushing 210 lengthens tracking distance between the charged conductor rod or rods inside the penetrator assembly and the ground plane that exists around the penetrator assembly. Bushing 210 has through bore 212 engaging over end portion 38 of the ceramic insulator body 14 and a wave-like outer geometry with ribs or ridges 214 which increases tracking distance over a relatively small axial distance.

In each of the above embodiments, a hermetic electrical penetrator assembly is provided which is suitable for use in high temperature, high pressure, high voltage, and high current application, such as powering of subsea electrical submersible (ESP) pump equipment which is used to pump hydrocarbons in oil rig installations and the like. Other applications for the penetrator assemblies in the above embodiments include high temperature, high pressure downhole electrical penetrations and other electrical penetrations used in subsea equipment of various types. The penetrator assemblies are scalable for a variety of current and voltage requirements. The penetrator assemblies of the above embodiments each include a two part conductor extending through the ceramic body which can move to accommodate different rates of thermal expansion and contraction as a result of extreme temperature changes The above designs lower stress under pressure extremes, and higher pressure on either side of the dual conductor assembly does not appreciably impact the conductor opposite the higher pressure side. This is an improvement over standard penetrator assemblies designed to have high pressure at one end only.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

We claim:

1. An electrical penetrator, comprising:
an outer housing of non-conductive, insulating material having a through bore and opposite first and second ends;
a first, elongate electrical conductor extending through at least part of the length of the through bore and having a first end outside a first end of the outer housing and a second end;
a second electrical conductor having a first end and a second end, at least the second end of the second electrical conductor being located outside the second end of the outer housing;
the second end of the first electrical conductor being in electrical communication with the first end of the second electrical conductor, and at least one of the conductors being movable relative to the other conductor while maintaining electrical communication between the conductors; and
a first hermetic seal extending between the first end of the housing and the first electrical conductor and a second hermetic seal extending between the second end of the housing and the second electrical conductor.

2. The penetrator of claim 1, wherein the seals are of conductive material.

3. The penetrator of claim 1, wherein the seals are J-shaped.

4. The penetrator of claim 1, wherein the seals are Z-shaped.

5. The penetrator of claim 1, wherein each seal comprises a metal sleeve.

6. The penetrator of claim 5, wherein each sleeve is brazed to the respective end of the housing and brazed or welded to the respective electrical conductor.

7. The penetrator of claim 5, wherein each seal comprises a cylindrical metal sleeve having an outer surface substantially flush with adjacent surfaces of the housing and the respective electrical conductor.

8. The penetrator of claim 1, wherein the seals are of an alloy metal having a lower coefficient of thermal expansion than the conductors.

9. The penetrator of claim 1, wherein the second conductor has a socket at its first end having an inner end, and the first conductor has second end portion which is telescopically engaged in the socket to accommodate relative movement between the first and second conductors.

10. The penetrator of claim 9, further comprising a conductive spring mounted in the socket between the second end of the first conductor and the inner end of the socket.

11. The penetrator of claim 10, wherein the conductive spring is a coil spring.

12. An electrical penetrator assembly, comprising:
an outer penetrator housing having a through bore; and
a penetrator pin assembly extending through at least part of the bore in the outer housing;
the penetrator pin assembly comprising an outer sleeve of non-conductive, insulating material having a through bore and opposite first and second ends, an electrical conductor shaft extending through the sleeve and have opposite first and second ends extending outwardly from opposite ends of the sleeve, the electrical conductor shaft comprising first and second conductor portions, a first hermetic seal extending between the first conductor portion and the outer sleeve and a second hermetic seal extending between the second conductor portion and the outer sleeve; and at least one hermetic sealing sleeve of conductive material secured between the outer sleeve and the penetrator housing.

13. The penetrator of claim 9, wherein the second end portion of the first conductor has a plurality of axially extending, radially outwardly projecting ribs and the socket has a plurality of matching axially extending, radially inwardly projecting grooves configured for mating engagement with the ribs when the second end portion is telescopically engaged in the socket.

14. The penetrator of claim 1, wherein the second conductor has a socket at its first end, the socket having an inner end, the second end of the first conductor is adjacent the first end of the second conductor, and a spring is mounted in the socket between the second end of the first conductor and the inner end of the socket to accommodate relative movement between the first and second conductors.

15. The penetrator of claim 1, wherein the first conductor extends completely through the through bore in the outer housing and the second end of the first conductor is in electrical communication with the first end of the second conductor outside the second end of the housing.

16. The penetrator of claim 15, wherein the second conductor comprises a conductive socket member configured for connection to the end of a cable.

17. The penetrator of claim 16, wherein the first end of the first conductor is configured for connection to a second cable.

18. The penetrator of claim 17, wherein the first end of the first conductor has a rounded conductive tip configured for releasable mating engagement in a conductive socket of a receptacle connector unit.

19. The penetrator of claim 1, further comprising an inner conductive or semi-conductive coating layer on the through bore.

20. The penetrator of claim 19, wherein the inner coating layer extends over at least part of each of the opposite ends of the housing.

21. The penetrator of claim 1, wherein the conductors are of copper material.

22. The penetrator of claim 1, wherein the housing is of ceramic material.

23. The penetrator of claim 1, wherein the housing has an outer surface of stepped diameter comprising a larger diameter central portion, smaller diameter first and second portions at opposite ends of the central portion, and first and second shoulders between the central portion and the first and second end portion, respectively.

24. The penetrator of claim 23, wherein the shoulders are each inclined at a predetermined angle towards the respective end portions.

25. The penetrator of claim 23, further comprising an outer coating of conductive material extending over the larger diameter central portion and at least part of the smaller diameter first and second end portions of the housing.

26. The penetrator of claim 25, wherein the outer coating has a first end spaced from the first end of the insulator housing and a second end spaced from the second end of the insulator housing.

27. The penetrator of claim 1, further comprising an electrical insulation bushing extending over at least part of the housing at one end of the housing.

28. The penetrator of claim 27, wherein the electrical insulation bushing has a wave-like outer geometry configured to increase the tracking distance between the first conductor and a ground plane around the penetrator.

29. The penetrator of claim 27, wherein the bushing extends over the first end of the housing and at least part of the first hermetic seal.

30. The penetrator assembly of claim 12, wherein the sealing sleeve is J-shaped.

31. The penetrator assembly of claim 12, wherein the sealing sleeve is Z-shaped.

32. The penetrator unit of claim 12, wherein the outer housing further comprises a retainer plate of rigid material secured in the housing through bore which retains the penetrator pin assembly in the housing, the retainer plate having a bore through which part of the penetrator pin assembly extends.

33. The penetrator unit of claim 32, wherein the outer sleeve is of stepped diameter and has an enlarged portion, first and second portions at opposite ends of the enlarged portion which are of smaller diameter than the enlarged portion, and first and second shoulders between the enlarged portion and the first and second portion, respectively.

34. The penetrator unit of claim 33, wherein the retainer plate engages over the penetrator pin assembly at the first shoulder and the opening in the retainer plate has an internal shape substantially matching the shape of the first end portion, first shoulder, and enlarged portion of the outer sleeve at the first shoulder, and said at least one hermetic sealing sleeve is secured to the enlarged portion of the outer sleeve and an adjacent portion of the housing.

35. The penetrator unit of claim 34, wherein the outer housing has an outer opening of reduced diameter at a first end of the through bore, the second portion of the outer sleeve extending out through the outer opening, and a second sealing sleeve is secured between the second portion of the outer sleeve and the outer opening of the outer housing.

36. The penetrator unit of claim 35, wherein the first and second sealing sleeves comprise oppositely directed, J-shaped sealing sleeves.

37. The penetrator assembly of claim 34, wherein the hermetic sealing sleeve comprises a Z-shaped sealing sleeve.

* * * * *